United States Patent
Miyoshi et al.

(10) Patent No.: US 9,850,793 B2
(45) Date of Patent: Dec. 26, 2017

(54) AUTOMATIC REGENERATION CONTROL DEVICE FOR PARTICULATE FILTER

(71) Applicant: HINO MOTORS, LTD., Hino-shi (JP)

(72) Inventors: Kenji Miyoshi, Tokyo (JP); Akihito Roppongi, Tokyo (JP); Masaru Hironaka, Tokyo (JP)

(73) Assignee: HINO MOTORS, LTD., Hino-shi (JP)

(*) Notice: Subject to any disclaimer, the term of this patent is extended or adjusted under 35 U.S.C. 154(b) by 238 days.

(21) Appl. No.: 14/655,093

(22) PCT Filed: Dec. 9, 2013

(86) PCT No.: PCT/JP2013/007219
§ 371 (c)(1),
(2) Date: Jun. 24, 2015

(87) PCT Pub. No.: WO2014/103196
PCT Pub. Date: Jul. 3, 2014

(65) Prior Publication Data
US 2015/0369099 A1    Dec. 24, 2015

(30) Foreign Application Priority Data

Dec. 25, 2012 (JP) ................................ 2012-280693

(51) Int. Cl.
*F01N 3/025* (2006.01)
*F02D 41/02* (2006.01)
(Continued)

(52) U.S. Cl.
CPC ....... *F01N 3/0253* (2013.01); *B01D 46/0061* (2013.01); *F01N 3/106* (2013.01);
(Continued)

(58) Field of Classification Search
CPC ... F01N 9/00; F01N 3/023; F01N 3/10; F01N 3/035; F01N 11/00; F01N 3/025; F02D 43/00
(Continued)

(56) References Cited

U.S. PATENT DOCUMENTS

2010/0122522 A1* 5/2010 Tsukada .................... E02F 9/00
60/284
2010/0170227 A1* 7/2010 Tsukada .................... E02F 9/00
60/286
(Continued)

FOREIGN PATENT DOCUMENTS

EP    2 187 012 A2    5/2010
EP    2 208 872 A1    7/2010
(Continued)

OTHER PUBLICATIONS

International Search Report dated Feb. 25, 2014 in PCT/JP2013/007219 filed Dec. 9, 2013.
(Continued)

*Primary Examiner* — Duane Smith
*Assistant Examiner* — Minh-Chau Pham
(74) *Attorney, Agent, or Firm* — Oblon, McClelland, Maier & Neustadt, L.L.P.

(57) ABSTRACT

An automatic regeneration controller for a particular filter comprises an engine controller, a unit controller, and a load application cancellation switch. With filter regeneration being started by determination of particulate accumulation and with an idling or light-load operation being conducted, load request to a work unit is outputted from the engine controller to the unit controller. Then, when load application is not possible or the load application cancellation switch is on and, in addition, exhaust temperature is not maintainable with no load application, a regeneration stop signal is
(Continued)

outputted from the unit controller to the engine controller and a regeneration stop signal reception process is conducted in the engine controller, and with no forced load application to a hydraulic unit, fuel addition is stopped to stop automatic regeneration control.

7 Claims, 3 Drawing Sheets

(51) Int. Cl.
    *F02D 29/04*     (2006.01)
    *F01N 9/00*     (2006.01)
    *B01D 46/00*     (2006.01)
    *F01N 3/10*     (2006.01)
    *F01N 13/00*     (2010.01)

(52) U.S. Cl.
    CPC ............. *F01N 9/002* (2013.01); *F02D 29/04* (2013.01); *F02D 41/029* (2013.01); *F01N 13/0097* (2014.06); *F01N 2430/085* (2013.01); *F01N 2590/08* (2013.01); *F01N 2590/10* (2013.01); *F01N 2900/1404* (2013.01); *F02D 2041/026* (2013.01); *F02D 2200/0812* (2013.01); *Y02T 10/47* (2013.01)

(58) Field of Classification Search
    USPC .......... 55/385.3, DIG. 30; 60/274, 295, 284, 60/286, 297, 299, 285, 277, 287
    See application file for complete search history.

(56) References Cited

U.S. PATENT DOCUMENTS

| 2011/0173958 | A1* | 7/2011 | Masuda | F01N 9/002 60/285 |
|---|---|---|---|---|
| 2012/0047883 | A1 | 3/2012 | Kamiya et al. | |
| 2012/0124979 | A1 | 5/2012 | Noma | |
| 2012/0260633 | A1* | 10/2012 | Masuda | F01N 3/0235 60/274 |
| 2013/0333355 | A1* | 12/2013 | Lee | F01N 3/0253 60/274 |
| 2015/0135685 | A1 | 5/2015 | Kamiya et al. | |

FOREIGN PATENT DOCUMENTS

| EP | 2 320 056 A1 | 5/2011 |
|---|---|---|
| EP | 2 423 481 A1 | 2/2012 |
| EP | 2 657 476 A2 | 10/2013 |
| JP | 2005 155574 | 6/2005 |
| JP | 2009 191654 | 8/2009 |
| JP | 2011 17256 | 1/2011 |
| JP | 2012 47107 | 3/2012 |
| WO | WO 2012/087082 A2 | 6/2012 |

OTHER PUBLICATIONS

Extended European Search Report dated Jul. 1, 2016 in Patent Application No. 13869791.7.

* cited by examiner

AUTOMATIC REGENERATION CONTROL DEVICE FOR PARTICULATE FILTER

TECHNICAL FIELD

The present invention relates to an automatic regeneration controller for a particulate filter.

BACKGROUND ART

Generally, particulates (particulate matter) from a diesel engine in an automobile is mainly constituted by carbonic soot and a soluble organic fraction (SOF) of high-boiling hydrocarbon and contains a trace of sulfate (misty sulfuric acid fraction). For reduction of such particulates, it has been carried out to incorporate a particulate filter in an exhaust pipe through which an exhaust gas flows.

Such kind of particulate filter has a porous honeycomb structure made of ceramics such as cordierite and having lattice-like compartmentalized passages; alternate ones of the passages have plugged inlets and the remaining passages with unplugged open inlets have plugged outlets. Thus, only the exhaust gas passing through thin porous walls compartmentalizing the passages is discharged downstream.

The particulates in the exhaust gas, which are captured and accumulated on inner surfaces of the thin porous walls, require to be burned off for regeneration of the particulate filter before exhaust resistance increases due to clogging. However, exhaust gas from a normal engine in an automobile rarely has a chance to reach a temperature level at which the particulates ignite by themselves, so that employed is a catalyst-regenerative particulate filter integrally carrying an oxidation catalyst.

Specifically, such employment of the catalyst-regenerative particulate filter facilitates an oxidation reaction of the particulates captured to lower an ignition temperature, so that the particulates may be burned off even at an exhaust temperature level lower than ever before.

However, even in such employment of the catalyst-regenerative particulate filter, a captured amount may exceed a treatment amount of the particulates in an operation area having a lower exhaust temperature level. Continued operation at such lower exhaust temperature level may hinder sufficient regeneration of the particulate filter, possibly resulting in excessive accumulation of the captured particulates in the particulate filter.

Thus, it has been conceived that a flow-through oxidation catalyst is additionally arranged on an entry side of the particulate filter; with the accumulation of the particulates becoming increased, fuel is added to the exhaust gas upstream of the particular filter to regenerate the particulate filter.

Specifically, the addition of the fuel upstream of the particulate filter in post injection or the like generates HC gas which causes an oxidation reaction on the oxidation catalyst of the particulate filter. Heat of the reaction increases a bed temperature of the catalyst to burn off the particulates, thereby regenerating the particulate filter.

Specific measure for such fuel addition may be such that main injection of the fuel near a compression top dead center is followed by post injection at non-ignition timing after the top dead center to add the fuel into the exhaust gas.

Nowadays application of such particulate filter not only to an automobile but also to a crane, a shovel or other constructing machine has been reviewed. It has been conceived that an accumulation amount of the particulates is estimated on the basis of, for example, a cumulative amount of a difference between estimated generation and treatment amounts of particulates calculated from a difference of pressures before and after the particulate filter, an engine rotation frequency and a load, and regeneration of the particulate filter is automatically conducted when the estimated value exceeds a set value.

However, even if the automatic regeneration control of the particulate filter is conducted during a work, the regeneration of the particulate filter may be not always completed depending on an intermittent situation of the work; repetition of such situations may increase the accumulation amount of the particulates in the particulate filter.

Thus, it is required that, in case of a great amount of particulates being accumulated in the particulate filter, regeneration of the particulate filter can be arbitrarily conducted even not during the work depending on an operator's intention (automatic control with a proper flagging may be alternatively used). However, trial to regenerate the particulate filter in an idling state not during the work would result in vain since a sufficient oxidation reaction of HC gas on the oxidation catalyst were unexpectable because of too low exhaust temperature.

For example, in a case of an automobile, a technique has been suggested that a temperature of the exhaust gas is increased by increasing an idling rotation frequency during idling while an exhaust brake or an intake valve is closed. However, in a case of a constructing machine, parts such as the exhaust brake and the intake valve are not installed unlike the case of the automobile; to newly provide these parts only for regeneration of the particulate filter would result in substantial increase in cost.

Moreover, even if the exhaust brake and the intake valve are newly provided to conduct exhaust or intake throttling, substantial increase in temperature of the exhaust gas is unexpectable in the idling state, so that it takes much time to complete the regeneration of the particulate filter, unavoidably resulting in increase in cost due to increase in an added amount of the fuel.

In order to overcome these disadvantages, the inventors developed a technique of effectively regenerating at low cost a particulate filter arranged in an industrial engine such as that mounted on a constructing machine or the like for driving a hydraulic or other work unit using engine power to conduct various works (see, for example, Patent Literature 1).

Patent Literature 1 discloses that for regeneration of the particulate filter, forced load application to the work unit intentionally increases an engine load, and a post injection or other fuel addition is conducted with the exhaust temperature being increased by the increased load.

CITATION LIST

Patent Literature

Patent Literature 1: JP 2009-191654A

SUMMARY OF INVENTION

Technical Problems

However, even if an operator determines depending on a situation of the work unit that the forced load application to the work unit is to be stopped, there is no measure for stopping the load application in the Patent Literature 1 disclosed, possibly resulting in a problem in the work. There is a room for improvement in this respect.

It is also revealed from researches of the inventors that in some kinds of constructing machines, a load on a hydraulic or other work unit is relatively light even during a work and an engine torque is not so high, so that if load application is stopped by an operator's determination during the automatic regeneration control being conducted for the post injection or other fuel addition on the engine side, the exhaust temperature may not be maintained to be high, possibly leading not only to incomplete regeneration of the particulate filter but also to deteriorated fuel economy and generation of white smoke.

The invention was made in view of the above and has its object to provide an automatic regeneration controller for a particulate filter which can stop forced load application to a work unit depending on a situation of the work unit to thereby smooth the work and which can stop the regeneration of the particulate filter when the exhaust temperature cannot be maintained to be high upon the stoppage of the load application during automatic regeneration control of the particulate filter, thereby preventing deteriorated fuel economy and generation of white smoke.

Solution to Problems

The invention is directed to an automatic regeneration controller for a particulate filter wherein an oxidation catalyst and the particulate filter are sequentially arranged in an exhaust pipe of an industrial engine for driving a work unit using engine power to conduct various works, fuel being added to the exhaust gas upstream of the oxidation catalyst with a load being forcedly applied to said work unit to intently increase an engine load and increase an exhaust temperature by said increased load, said added fuel undergoing oxidation reaction on the oxidation catalyst and resultant reaction heat burning captured particulates in the particulate filter just behind to thereby conduct regeneration of said particulate filter, comprising an engine controller for outputting a fuel injection signal to said industrial engine when an estimated accumulation amount of said particulates is determined to exceed a set value, a unit controller for outputting a unit control signal to said hydraulic unit for collaborative control thereof, collaborative control signals being mutually inputted and outputted between said unit and engine controllers and a load application cancellation switch for outputting a cancellation signal to said unit controller depending upon a situation of said work unit to stop the forced load application to said work unit, the automatic regeneration controller being configured such that, with the regeneration of the particulate filter being started by determination of captured particulate accumulation, with an idling or light-load operation being conducted, and with load request to said work unit being outputted from said engine controller to said unit controller, when the load application is not possible or the load application cancellation switch is on and, in addition, maintaining of an exhaust temperature with no load application is not possible, then a regeneration stop signal is outputted from said unit controller to said engine controller to conduct a regeneration stop signal reception process in said engine controller to thereby stop, with no forced load application to the work unit, the fuel addition to stop the automatic regeneration control.

The automatic regeneration controller for the particulate filter may be configured such that, with the regeneration of the particulate filter being started by determination of captured particulate accumulation, with the idling or light-load operation being conducted, and with load request to said work unit being outputted from said engine controller to said unit controller, when the load application is not possible or the load application cancellation switch is on and, in addition, maintaining the exhaust temperature with no load application is possible, then the fuel addition is conducted and the automatic regeneration control is continued with no forced load application to said work unit.

Further, the automatic regeneration controller for the particulate filter may be configured such that, with regeneration of the particulate filter being started by determination of captured particulate accumulation, with the idling or light-load operation being conducted, and with load request to said work unit being outputted from said engine controller to said unit controller, when the load application is possible and the load application cancellation switch is off, then the fuel addition is conducted and the automatic regeneration control is continued with the forced load application to said work unit being conducted to intentionally increase the engine load and increase the exhaust temperature by said increased load.

Still further, the automatic regeneration controller for the particulate filter may be configured such that, with regeneration of the particulate filter being started by determination of captured particulate accumulation and with no idling or light-load operation being conducted, the fuel addition is conducted and the automatic regeneration control is continued with no forced load application to said work unit.

Advantageous Effects of Invention

An automatic regeneration controller for a particulate filter according to the invention can exhibit excellent effects that forced load application to a work unit can be stopped depending upon a situation of the work unit to thereby smooth the work and that regeneration of a particulate filter can be stopped when an exhaust temperature cannot be maintained to be high upon the stoppage of the load application during automatic regeneration control of the particulate filter, thereby preventing deteriorated fuel economy and generation of white smoke.

DESCRIPTION OF EMBODIMENT

Next, an embodiment of the invention will be described in conjunction with the drawings.

Figure 1:
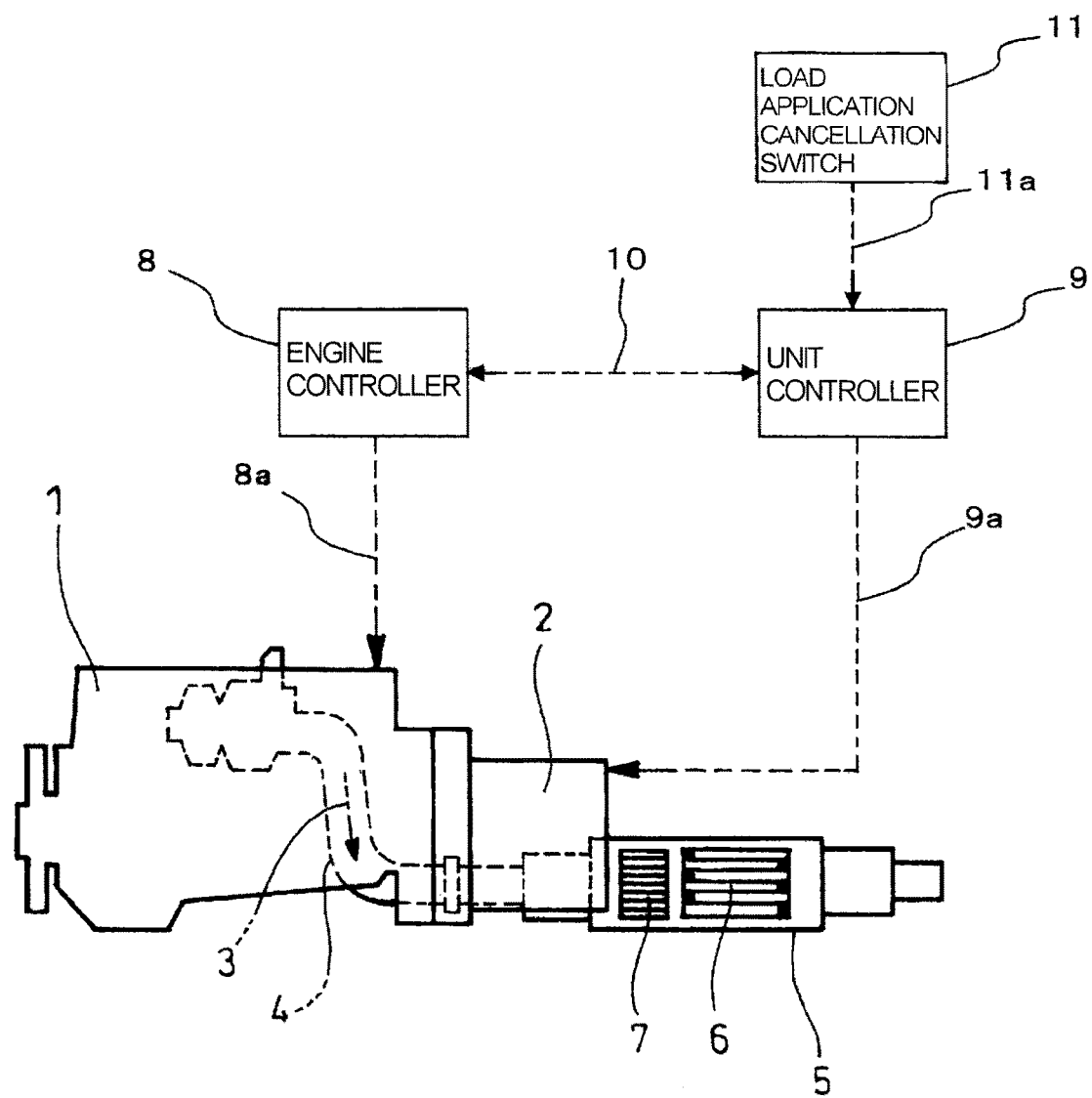
FIG. 1 is an overall schematic view showing an embodiment of an automatic regeneration controller for a particulate filter according to the invention.
Figure 2:
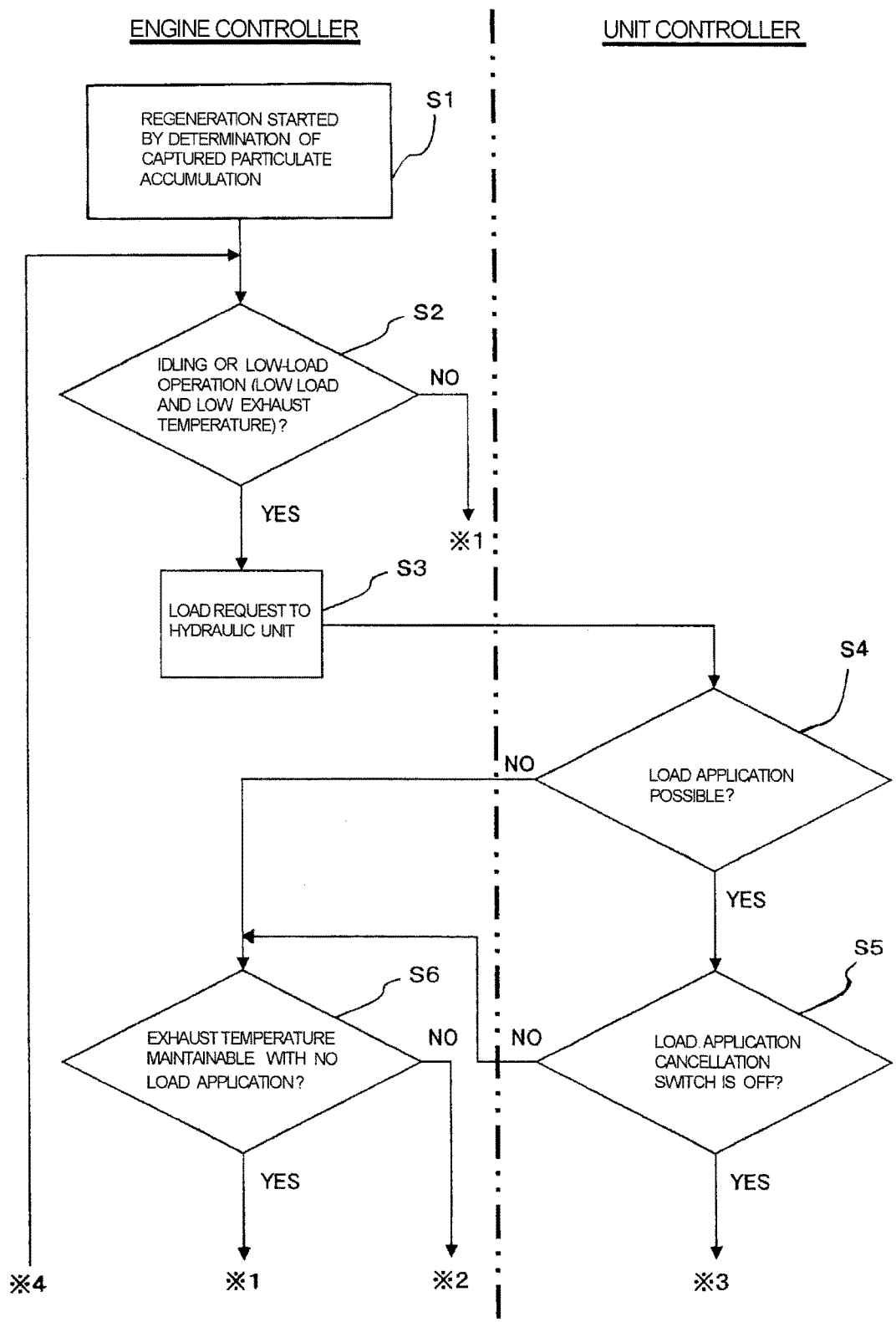
FIG. 2 is a flowchart showing control flow in the embodiment of the automatic regeneration controller for the particulate filter according to the invention.
Figure 3:
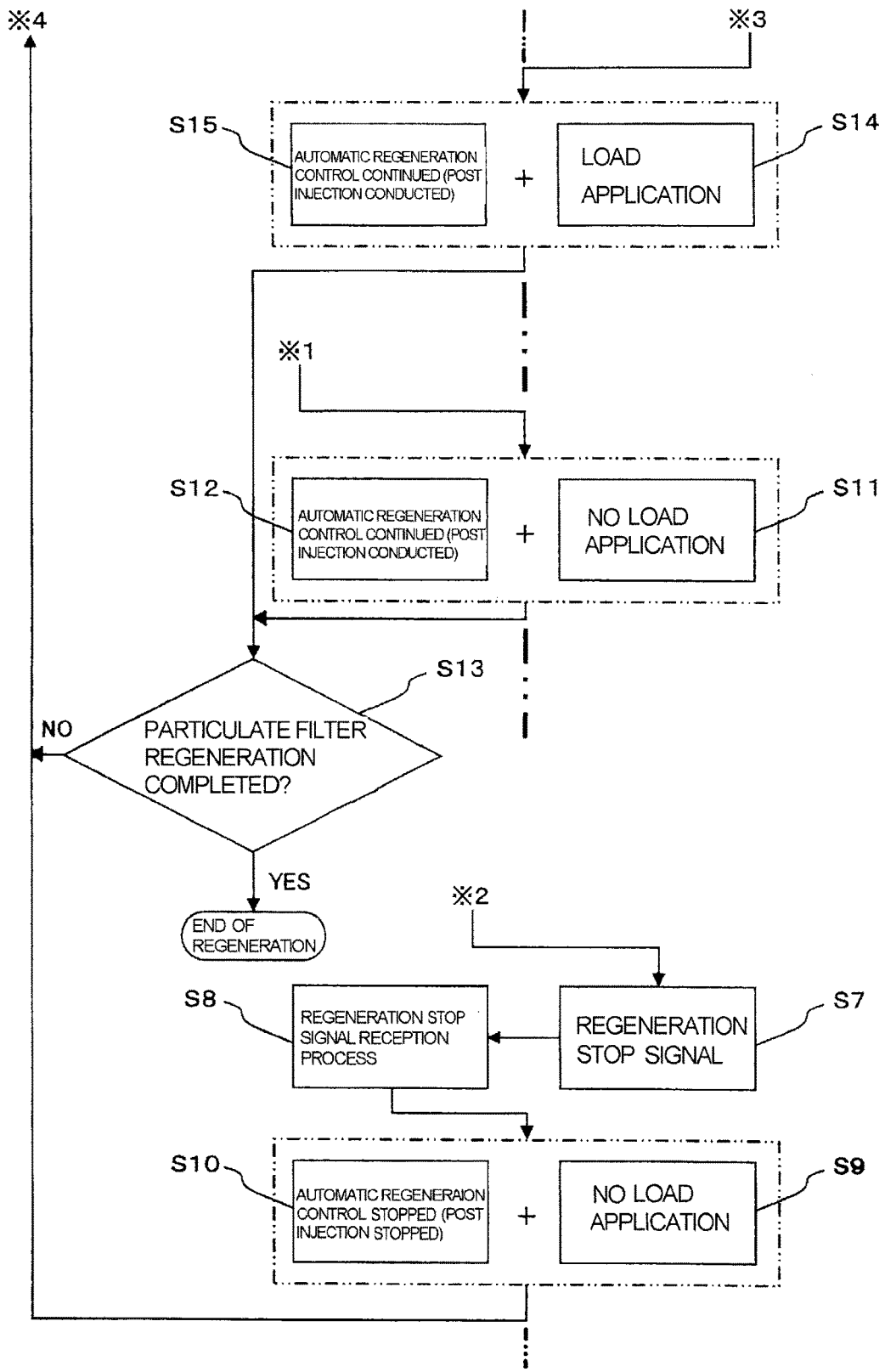
FIG. 3 is the flowchart showing control flow in the embodiment of the automatic regeneration controller for the particulate filter according to the invention.

FIGS. 1-3 show the embodiment of an automatic regeneration controller for a particulate filter according to the invention. Reference numeral 1 denotes an industrial engine mounted on a crane, a shovel or other constructing machine; and 2, a hydraulic unit as work unit driven by the industrial engine 1. Exhaust gas 3 discharged from the industrial engine 1 flows through an exhaust pipe 4 in which incorporated is a filter case 5. Contained in the filter case 5 on a downstream side is a particulate filter 6 for capture of particulates in the exhaust gas 3; and contained in the filter case 5 on an upstream side is an oxidation catalyst 7 for oxidation treatment of unburned HC gas in the exhaust gas 3.

Fuel injection control in the industrial engine 1 is conducted on the basis of a fuel injection signal 8a outputted from an engine controller 8. In the engine controller 8, an accumulation amount of the particulates is estimated on the basis of, for example, a cumulative amount of a difference between estimated production and treatment amounts of the particulates calculated from a difference in pressure before and after the particulate filter 6, an engine rotation frequency and a load. When the estimated accumulation amount is determined to exceed a set value, a fuel injection signal 8a is outputted to conduct post injection at non-ignition timing after the compression top dead center following main injection of the fuel near the compression top dead center (crank angle 0°).

Specifically, the post injection at the non-ignition timing after the compression top dead center following the main injection adds unburned fuel into the exhaust gas 3, so that the unburned fuel generates HC gas with high concentration which is directed to the entry-side oxidation catalyst 7.

At the same time, collaborative control signals 10 are mutually inputted and outputted between the engine and unit controllers 8 and 9 for control of the hydraulic unit 2 as the work unit, so that the hydraulic unit 2 is collaboratively controlled by a unit control signal 9a outputted from the unit controller 9. For load application to the hydraulic unit 2, a hydraulic pump is driven to circulate an operating oil to thereby conduct a load application operation in the hydraulic unit 2.

Further, a load application cancellation switch 11 is provided to output, to the unit controller 9, a cancellation signal 11a for stoppage of the forced load application to the hydraulic unit 2 depending on a situation of the hydraulic unit 2. The load application cancellation switch 11 can be operated by an operator as needs demand.

The embodiment is configured, as shown in the flowchart of FIGS. 2 and 3, such that when the regeneration of the particulate filter 6 is started by determination in the engine controller 8 of captured particulate accumulation (see step S1), firstly made is determination on whether an idling or light-load operation is conducted or not (see step S2); if the idling or light-load operation being conducted is determined, load request to the hydraulic unit 2 as the work unit is outputted from the engine controller 8 to the unit controller 9 (see step S3). Then, when determination made on whether load application is possible or not (see step S4) is negative or when determination made on whether the load application cancellation switch 11 is off or not (see step S5) is negative, made is determination on whether exhaust temperature is maintainable or not with no load application (see step S6); if the exhaust temperature not maintainable with no load application is determined, then a regeneration stop signal is outputted from the unit controller 9 to the engine controller 8 (see step S7) and a regeneration stop signal reception process is conducted in the engine controller 8 (see step S8), and with no forced load application to the hydraulic unit 2 (see step S9), the post injection or other fuel addition is stopped to stop the automatic regeneration control (see step S10). After the automatic regeneration control is stopped in the above-mentioned step S1, the procedure is returned to the above-mentioned step S2 to determine whether the idling or light-load operation is conducted or not, and controls with determinations similar to those mentioned in the above are repeated.

The configuration is further such that when the determination in the above-mentioned step S6 made on whether the exhaust temperature is maintainable or not with no load application is affirmative, then with no forced load application to the hydraulic unit 2 as the work unit (see step S11), the post injection or other fuel addition is conducted to continue the automatic regeneration control (see step S12). With the automatic regeneration control being continued in the above-mentioned step S12, if determination made on whether the regeneration of the particulate filter 6 is completed or not (see step S13) is affirmative, the regeneration is ended; if negative, the procedure is returned to the above-mentioned step S2 to determine whether the idling or light-load operation is conducted or not, and controls with determinations similar to those mentioned in the above are repeated.

Further, the configuration is such that, when the determination made in the above-mentioned step S4 on whether load application is possible or not is affirmative and the determination made in the above-mentioned step S5 on whether load application cancellation switch 11 is off or not is affirmative, then with the forced load application to the hydraulic unit 2 as the work unit being conducted (see step S14) to intentionally increase the engine load and increase the exhaust temperature by the increased load, the post injection or other fuel addition is conducted to continue the automatic regeneration control (see step S15). With the automatic regeneration control being continued in the above-mentioned step S15, if determination made on whether the regeneration of the particulate filter 6 is completed or not (see step S13) is affirmative, the regeneration is ended; if negative, the procedure is returned to the above-mentioned step S2 to determine whether the idling or light-load operation is conducted or not, and controls with determinations similar to those mentioned in the above are repeated.

The configuration is such that, when the determination made in the above-mentioned step 2 on whether the idling or light-load operation is conducted or not is negative, the load has been already applied, so that with no forced load application to the hydraulic unit 2 as the work unit (see step S11), the post injection or other fuel addition is conducted to continue the automatic regeneration control (see step S12).

Next, a mode of operation of the above embodiment will be described.

When the regeneration of the particulate filter 6 is started by determination of captured particulate accumulation in the engine controller 8 (see step S1), firstly made is the determination on whether the idling or light-load operation is conducted or not (see step S2); if the idling or light-load operation being conducted is determined, load request to the hydraulic unit 2 as the work unit is outputted from the engine controller 8 to the unit controller 9 (see step S3).

Then, when the determination made on whether the load application is possible or not (see step S4) is negative or the determination made on whether the load application cancellation switch 11 is off or not (see step S5) is negative, then made is the determination on whether the exhaust temperature is maintainable or not with no load application (see step S6); if the exhaust temperature not maintainable with no load application is determined, then the regeneration stop signal is outputted from the unit controller 9 to the engine controller 8 (see step S7) and the regeneration stop signal reception process is conducted in the engine controller 8 (see step S8), and with no forced load application to the hydraulic unit 2 (see step S9), the post injection or other fuel addition is stopped to stop the automatic regeneration control (see step S10).

After the automatic regeneration control is stopped in the above-mentioned step S1, the procedure is returned to the above-mentioned step S2 to determine whether the idling or light-load operation is conducted or not, and controls with determinations similar to those mentioned in the above are repeated.

When the determination in the above-mentioned step S6 made on whether exhaust temperature is maintainable with no load application is affirmative, then with no forced load application to the hydraulic unit 2 as the work unit (see step S11), the post injection or other fuel addition is conducted to continue the automatic regeneration control (see step S12). In this connection, in the shovel or other constructing machine, a load on the hydraulic unit 2 during a work is relatively great and an engine torque is high, so that, with the automatic regeneration control being conducted on the engine side and with the post injection or other fuel addition being conducted, the exhaust temperature can be maintained to be high even if an operator determines to turn on the load application cancellation switch 11 to stop the load application. With the automatic regeneration control being continued in the above-mentioned step S12, if the determination made on whether the regeneration of the particulate filter 6 is completed or not (see step S13) is affirmative, the regeneration is ended; if negative, the procedure is returned to the above-mentioned step S2 to determine whether the idling or light-load operation is conducted or not, and controls with determinations similar to those mentioned in the above are repeated.

Further, when the determination made in the above-mentioned step S4 on whether load application is possible or not is affirmative and the determination made in the above-mentioned step S5 on whether the load application cancellation switch 11 is off or not is affirmative, then with the forced load application to the hydraulic unit 2 as the work unit being conducted (see step S14) to intentionally increase the engine load and increase the exhaust temperature by the increased load, the post injection or other fuel addition is conducted to continue the automatic regeneration control (see step S15). With the automatic regeneration control being continued in the above-mentioned step S15, if the determination made on whether the regeneration of the particulate filter 6 is completed or not (see step S13) is affirmative, the regeneration of the particulate filter 6 is ended; if negative, the procedure is returned to the above-mentioned step S2 to determine whether the idling or light-load operation is conducted or not, and controls with determinations similar to those mentioned in the above are repeated.

When the determination made in the above-mentioned step S2 on whether the idling or light-load operation is conducted or not is negative, the load has been already applied, so that with no forced load application to the hydraulic unit 2 as the work unit (see step S11), the post injection or other fuel addition is conducted to continue the automatic regeneration control (see step S12).

In the embodiment, an absolutely fundamental control is such that, with forced load application to the hydraulic unit 2 as the work unit being conducted (see step S14) to intentionally increase the engine load and increase the exhaust temperature by the increased load, the post injection or other fuel addition is conducted to continue the automatic regeneration control (see step S15). However, when an operator determines, depending upon a situation of the hydraulic unit 2, that the forced load application to the hydraulic unit 2 is to be stopped, the load application cancellation switch 11 can be turned on to stop the load application, resulting in no problem in the work.

In this connection, in the crane or other constructing machine, a load on the hydraulic unit 2 as the work unit during a work is relatively light and an engine torque is not so high, so that, with the automatic regeneration control being conducted on the engine side and with the post injection or other fuel addition being conducted, if by the operator's determination the load application cancellation switch 11 is turned on to stop the load application, the exhaust temperature may not be maintained to be high. However, in the embodiment, with the automatic regeneration control being conducted on the engine side and with the post injection or other fuel addition being conducted, if by the operator's determination the load application cancellation switch 11 is turned on to stop the load application and the fact of the exhaust temperature being not maintainable to be high is determined in step S6, then the regeneration stop signal is outputted from the unit controller 9 to the engine controller 8 in step S7; the regeneration stop signal reception process is conducted in the engine controller 8 in step S8; with no forced load application to the hydraulic unit 2 in step S9, the post injection or other fuel addition is stopped to stop the automatic regeneration control in step S10, so that deteriorated fuel economy and generation of white smoke can be averted.

Thus, the force load application to the hydraulic unit 2 as work unit can be stopped depending on a situation of the hydraulic unit 2 to thereby smooth the work. When exhaust temperature cannot be maintained to be high on stoppage of the load application during the automatic regeneration control of the particulate filter 6, the regeneration of the particulate filter 6 can be stopped to prevent deteriorated fuel economy and generation of while smoke.

It is to be understood that an automatic regeneration controller for a particulate filter according to the invention is not limited to the above embodiment and that various changes and modifications may be made without departing from the scope of the invention. For example, though the industrial engine with the hydraulic unit as work unit in the constructing machine is described in the embodiment, alternatively the work unit may be an electric generator, a compressor or the like. Though the forced load application to the hydraulic unit is exemplified by a technique that with hydraulic pressure being released, the hydraulic pump is driven to circulate the operating oil, alternatively the load may be applied by intentionally braking a drive system using the work unit. Further, the invention is applicable not only to a constructing machine but also to a forklift or other transporting machine.

INDUSTRIAL APPLICABILITY

An automatic regeneration controller for a particulate filter according to the invention may be utilized for an industrial engine which drives a work unit using engine power to conduct various works.

REFERENCE SIGNS LIST 1 industrial engine
2 hydraulic unit (work unit)
3 exhaust gas
4 exhaust pipe
6 particulate filter 7 oxidation catalyst
8 engine controller
8a fuel injection signal
9 unit controller
9a unit control signal
10 collaborative control signal
11 load application cancellation switch
11a cancellation signal

The invention claimed is:

1. An automatic regeneration controller for a particulate filter wherein an oxidation catalyst and the particulate filter are sequentially arranged in an exhaust pipe of an industrial engine for driving a work unit using engine power to conduct various works, fuel being added to an exhaust gas upstream of the oxidation catalyst with a load being forcedly applied to said work unit to intently increase an engine load and increase an exhaust temperature by said increased load, said added fuel undergoing oxidation reaction on the oxidation catalyst and resultant reaction heat burning captured particulates in the particulate filter just behind to thereby conduct regeneration of said particulate filter, comprising
an engine controller for outputting a fuel injection signal to said industrial engine when an estimated accumulation amount of said particulates is determined to exceed a set value,
a unit controller for outputting a unit control signal to said hydraulic unit for collaborative control thereof, collaborative control signals being mutually inputted and outputted between said work unit and engine controllers and
a load application cancellation switch for outputting a cancellation signal to said unit controller depending upon a situation of said work unit to stop the forced load application to said work unit,
the automatic regeneration controller being configured such that, with the regeneration of the particulate filter being started by determination of captured particulate accumulation, with an idling or light-load operation being conducted, and with load request to said work unit being outputted from said engine controller to said unit controller, when the load application is not possible or the load application cancellation switch is on and, in addition, maintaining of an exhaust temperature with no load application is not possible, then a regeneration stop signal is outputted from said unit controller to said engine controller to conduct a regeneration stop signal reception process in said engine controller to thereby stop, with no forced load application to the work unit, the fuel addition to stop the automatic regeneration control.

2. The automatic regeneration controller for the particulate filter as claimed in claim 1, configured such that, with the regeneration of the particulate filter being started by determination of captured particulate accumulation, with the idling or light-load operation being conducted, and with load request to said work unit being outputted from said engine controller to said unit controller, when the load application is not possible or the load application cancellation switch is on and, in addition, maintaining the exhaust temperature with no load application is possible, then the fuel addition is conducted and the automatic regeneration control is continued with no forced load application to said work unit.

3. The automatic regeneration controller for a particulate filter as claimed in claim 1, configured such that, with regeneration of the particulate filter being started by determination of captured particulate accumulation, with the idling or light-load operation being conducted, and with load request to said work unit being outputted from said engine controller to said unit controller, when the load application is possible and the load application cancellation switch is off, then the fuel addition is conducted and the automatic regeneration control is continued with the forced load application to said work unit being conducted to intentionally increase the engine load and increase the exhaust temperature by said increased load.

4. The automatic regeneration controller for a particulate filter as claimed in claim 1, configured such that, with regeneration of the particulate filter being started by determination of captured particulate accumulation and with no idling or light-load operation being conducted, the fuel addition is conducted and the automatic regeneration control is continued with no forced load application to said work unit.

5. The automatic regeneration controller for a particulate filter as claimed in claim 3, configured such that, with regeneration of the particulate filter being started by determination of captured particulate accumulation and with no idling or light-load operation being conducted, the fuel addition is conducted and the automatic regeneration control is continued with no forced load application to said work unit.

6. The automatic regeneration controller for a particulate filter as claimed in claim 2, configured such that, with regeneration of the particulate filter being started by determination of captured particulate accumulation, with the idling or light-load operation being conducted, and with load request to said work unit being outputted from said engine controller to said unit controller, when the load application is possible and the load application cancellation switch is off, then the fuel addition is conducted and the automatic regeneration control is continued with the forced load application to said work unit being conducted to intentionally increase the engine load and increase the exhaust temperature by said increased load.

7. The automatic regeneration controller for a particulate filter as claimed in claim 2, configured such that, with regeneration of the particulate filter being started by determination of captured particulate accumulation and with no idling or light-load operation being conducted, the fuel addition is conducted and the automatic regeneration control is continued with no forced load application to said work unit.

* * * * *